UNITED STATES PATENT OFFICE.

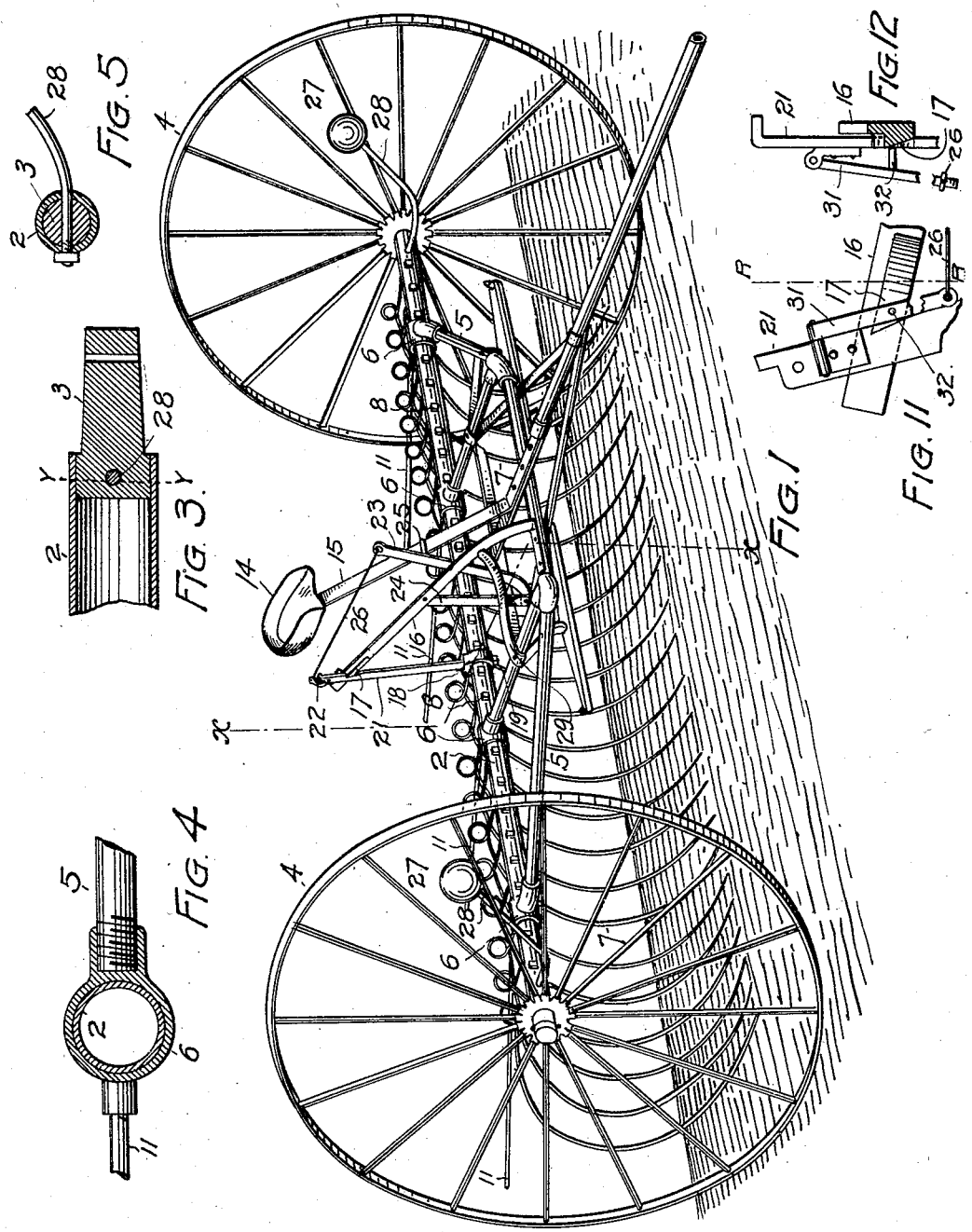

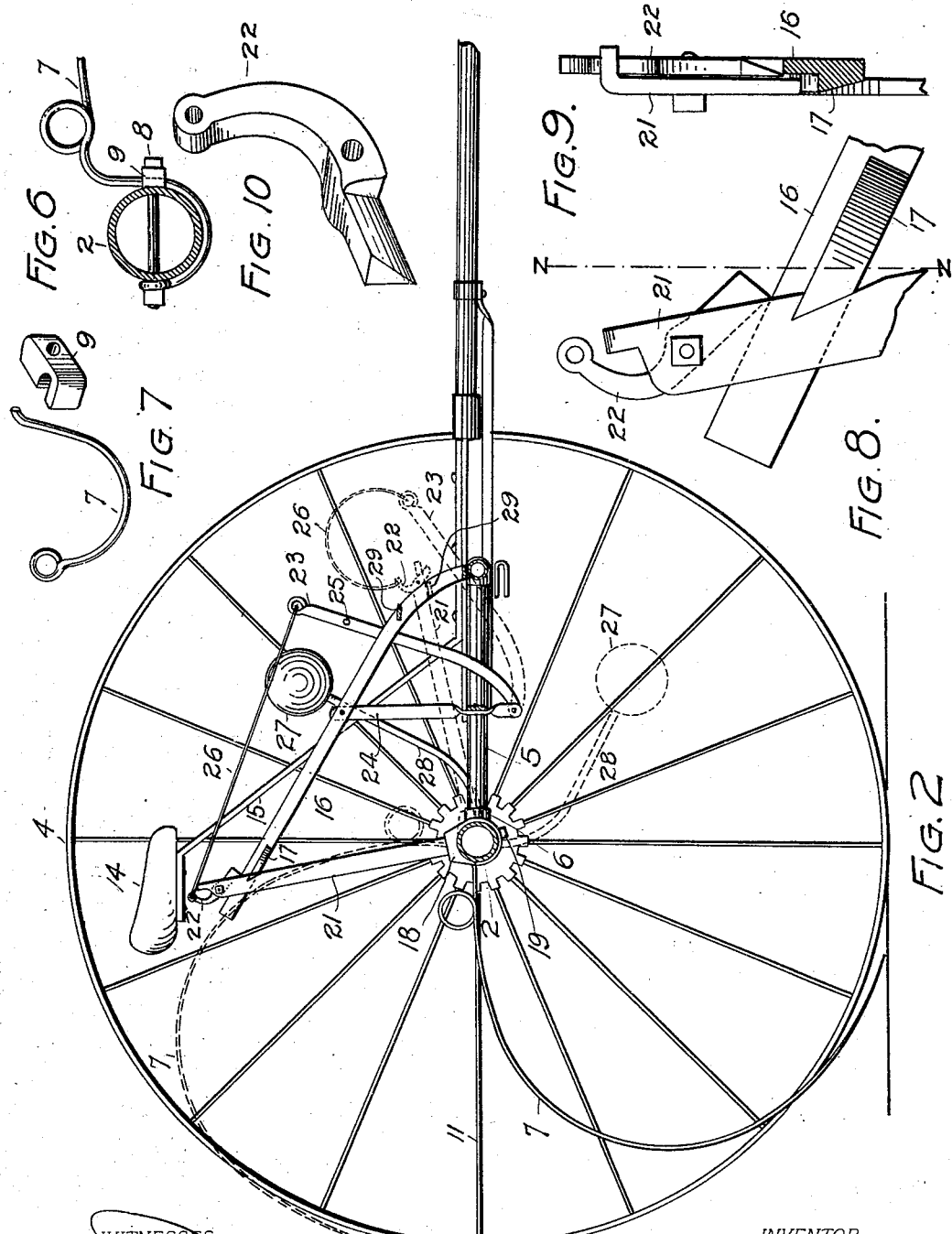

AMOS R. BLACK, OF LAMAR, COLORADO.

SULKY HAY-RAKE.

SPECIFICATION forming part of Letters Patent No. 694,719, dated March 4, 1902.

Application filed October 9, 1900. Serial No. 32,545. (No model.)

*To all whom it may concern:*

Be it known that I, AMOS R. BLACK, a citizen of the United States, residing at Lamar, in the county of Prowers and State of Colorado, have invented certain new and useful Improvements in Sulky Hay-Rakes; and I do hereby declare the following to be a full, clear, and exact description of the invention, such as will enable others skilled in the art to which it appertains to make and use the same.

The object of my improvements herein is to provide a durable and efficient sulky hay-rake that will do speedy and clean work in raking heavy crops, damp hay, and green alfalfa, prevent the rake-teeth from falling heavily to the ground after the load is dumped, automatically and rigidly lock the rake-head, thereby holding the rake-teeth to the ground to gather the load, thus relieving the driver from the laborious work of manually holding the rake-teeth to the ground to gather the load, support the axle or rake head in the center, thereby preventing wide rakes from sagging down in the middle, dump the load from the rake by the spring from the rake-teeth, discard ratchets, cog-wheels, dogs, or pawls, and other mechanism commonly used, a sulky hay-rake that the driver can operate the dump with his foot, leaving both his hands free at all times to guide the horses.

The invention consists of the arrangements, features, and combinations hereinafter described and claimed.

The accompanying drawings are referred to as forming a part of this specification, in which—

Figure 1 is a perspective view of the rake. Fig. 2 is a sectiontal elevation taken at X X, Fig. 1. Fig. 3 is an enlarged section through end of axle, showing manner of fastening spindles in the axle. Fig. 4 is an enlarged cross-section of the axle, showing the manner of connecting the frame to the axle and fastening the hay-fingers to the axle-rings. Fig. 5 is a section on a smaller scale, taken along line Y Y, Fig. 3, showing manner of fastening ball-arms to the axle. Fig. 6 is an enlarged cross-section through the axle, showing manner of fastening rake-teeth to the axle. Fig. 7 is an enlarged detail view showing the shank end of the rake-tooth 7 and the clip 9 in perspective. Fig. 8 is an enlarged view of the upper ends of the lock-bar 16, lock-arm 21, block-lock 17, and wedge-key 22, showing the parts locked in position for raking. Fig. 9 is a section taken along line Z Z, Fig. 8. Fig. 10 is an enlarged perspective view of the wedge-key 22. Fig. 11 is a detail view of a modified construction of unlocking mechanism for the lock-bar and lock-arm. Fig. 12 is a section taken along line R R, Fig. 11.

The tubular axle or rake-head 2 (see Figs. 3 and 5) is shrunken on the spindles 3. The running-wheels 4 are loosely mounted on the spindles 3. A tubular or pipe frame 5, provided with a guide tongue or pole, is connected to the tubular axle or rake-head 2 by means of the axle-rings 6, within which the axle or rake-head 2 rotates when the rake is dumped. The spring rake-teeth 7 (see Figs.1, 2, 6, and 7) are secured detachably to the axle or rake-head 2, being secured to place by the clamping-bolt 8 and the clip 9. The hay fingers or cleaners 11 are fastened to the axle-rings 6 and assist in cleaning the load from the rake-teeth 7 when the rake is dumped. The axle 2, the upper end or curved shank of the spring rake-teeth 7, the clamping-bolts 8, and the clips 9 form the rake-head. The spring-seat 14 is rigidly secured to the spring 15. The seat-spring 15 is rigidly secured to the pipe-frame 5.

The elevated lock-bar 16 is provided with an integral block-lock 17 on its side and is rigidly secured to the pipe-frame 5. The adjustable axle-collar 18 is secured to the axle 2 by the set-screw 19 and is adapted to set the spring rake-teeth to the ground in different positions required to rake different crops. The lower end of the elevated lock-arm 21 is rigidly secured to the adjustable axle-collar 18. The elevated lock-arm 21 is provided with a notch, (near the upper end,) which notch is adapted to engage and fit the rear end of the lock-block 17 and rigidly lock the rake-head, thus holding the spring rake-teeth 7 to the ground, and also supports the axle or rake-head from sinking in the center.

The swinging wedge-key 22 is loosely secured to the upper end of the elevated lock-arm 21 and is adapted to disengage the lock-arm 21 from the rear end of lock-block 17 by wedge-power and the slight resiliency contained in the lock-bar 16 and the lock-arm 21, thus unlocking the rake-head. The foot-lever 23 is secured loosely to the lower end of the frame-post 24, said foot-lever being provided with a foot-pin 25. The upper end of the foot-lever 23 and the upper end of the swinging wedge-key 22 are connected by the wire rope 26. The function of the foot-lever 23 is to unlock the rake-head, thus starting the rake-head to rotate.

The balls or weights 27 are rigidly secured to the upper ends of the ball-arms 28. The lower ends of said arms pass through the axle 2, being secured in position as shown in Figs. 1, 2, and 5. The weight of the balls 27 (in practice) is less than the weight of the spring rake-teeth 7. The function of the balls 27 is to neutralize or balance a large portion of the weight of the spring rake-teeth 7, thereby making the rake-head easily rotated, so as when the rake-head is instantaneously unlocked the spring thus obtained from the tension by the draft on the spring rake-teeth will rotate the rake-head and dump the load from the rake-teeth by means of the spring from the rake-teeth. Another function of the balls 27 is to prevent the rake-teeth from falling heavily back to the ground after the load is dumped from the rake.

The left-hand or lower end of the leaf-spring 29 is rigidly secured to the pipe-frame 5. When the rake is dumped, (see dotted lines, Fig. 2,) the lock-arm 21 comes in contact with the leaf-spring 29, thereby stopping the rotating movement of the rake-head. The leaf-spring 29 is adapted to quickly start the rake-head back after the load is dumped, thus enabling the rake-teeth to reach the ground by the time the running wheels 4 have passed the windrow dumped.

In Figs. 11 and 12 I have shown a modified form of unlocking mechanism. A lever-key 31 is pivoted at its upper end to the lock-arm 21 and provided on its lower end with a pin 32. The wire rope 26 is connected to the lever-key. The lever-key 31 is adapted to unlock the lock-arm 21 from the block-lock 17 by the pull of the wire rope 26 and the slight resiliency contained in the lock-bar 16 and the lock-arm 21. The pin 32 engages the lock-block 17 and is adapted to press the lock-bar 16 and the lock-block 17 out of engagement with the lock-arm 21 and instantly unlock the rake-head.

When the rake-teeth have gathered a load, the driver, occupying the seat 14, presses forward with his foot upon the foot-pin 25, which movement forces the upper end of the foot-lever 23 forward, thereby drawing the rear end of the swinging wedge-key upward and forward and forcing the front end of said wedge-key downward and backward between the lock-bar 16 and the lock-arm 21, thereby disengaging the lock-arm 21 from the block-lock 17 and instantly unlocks the rake and starts the rake-head rotating, or in case the lever-pin key is used the same movement of the driver's foot draws lever-key 31 in line with the lock-arm 21, thus causing the pin 32 to press against and disengage block-lock 17 from lock-arm 21, thus instantly unlocking the rake-head and starting the rake-head rotating. The spring from the rake-teeth being automatically applied at the same instant rotates the rake-head and dumps the load from the teeth, the dump being obtained by instantaneously unlocking the rigid rake-head when the spring rake-teeth are subjected to tension from dragging the load.

When the load is dumped from the rake-teeth, (see dotted lines, Fig. 2,) the lock-arm 21 engages the leaf-spring 29, storing tension in said spring and stopping the rotation of the rake-head and the balls 27. The tension on the spring 29 instantly reacts and causes the rake-head to commence to rotate backward. The weight of the spring rake-teeth being greater than the weight of the balls completes the backward rotation of the rake-head, automatically returning the balls 27, the foot-lever 23, the lock-arm 21, and the key to their original positions, as shown in Figs. 1, 8, and 11. The block-lock 17 and the lock-arm 21 then automatically relock the rake-head in a rigid position, automatically holding the spring rake-teeth to the ground until the next load is gathered.

Having thus described my invention, what I claim as new, and desire to secure by Letters Patent, is—

1. In a sulky hay-rake, the combination with a rake-head, spring rake-teeth connected thereto, and means for locking the rake in operative position, of a counterbalancing device for the spring rake-teeth which is adapted to neutralize the natural gravitation of the spring rake-teeth and thus assist them to rise by their own resiliency to dump the load when released, and means for limiting the movement of the rake-teeth to a partial revolution and returning them back to normal, operative, position after dumping.

2. In a sulky hay-rake, the combination with a rake-head and spring rake-teeth and means for locking the rake in operative position, said rake-teeth being adapted to rise by their inherent resiliency when released, of a weighted arm rigidly connected to the rake-head which is adapted to neutralize the natural gravitation of the rake-teeth and assist them to rise, and a spring adapted to limit the movement of the rake-teeth, in rising, to a partial revolution and to throw them back to normal position.

3. In a sulky hay-rake, the combination with a rake-head and rake-teeth, of a lock-arm connected thereto, a lock-bar on the machine-frame, engaging devices on the arm and bar adapted for interlocking, and a movable member positioned to spring the arm and bar apart laterally and thereby disengage their interlocking devices.

4. In a sulky hay-rake, the combination with a rake-head and rake-teeth, of a lock-arm connected thereto, a lock-bar on the machine-frame, engaging devices on the arm and bar adapted for interlocking, and a wedge adapted for movement between the arm and bar to wedge them apart laterally and cause the engaging devices to become disengaged.

In testimony that I claim the foregoing as my own I hereunto subscribe my name in the presence of two witnesses.

AMOS R. BLACK.

Witnesses:
G. J. ROLLANDET,
CHARLES S. BOOTH.